United States Patent [19]

Vrionis

[11] Patent Number: 5,932,981
[45] Date of Patent: Aug. 3, 1999

[54] APPARATUS AND METHOD FOR REDUCED VOLTAGE CONTROLLER

[75] Inventor: Nick Vrionis, Los Altos, Calif.

[73] Assignee: Gas Research Institute, Chicago, Ill.

[21] Appl. No.: 08/784,144

[22] Filed: Jan. 17, 1997

Related U.S. Application Data

[63] Continuation-in-part of application No. 08/733,532, Oct. 18, 1996, and application No. 08/733,533, Oct. 18, 1996, abandoned
[60] Provisional application No. 60/010,274, Jan. 19, 1996.
[51] Int. Cl.[6] ......................................... G05B 5/00
[52] U.S. Cl. ........................ 318/480; 318/434; 318/772; 318/782; 318/806
[58] Field of Search ...................... 318/434, 480, 318/772, 778, 782, 783, 798, 806, 811, 813, 808

[56] References Cited

U.S. PATENT DOCUMENTS

| | | | |
|---|---|---|---|
| 4,467,262 | 8/1984 | Curtiss | 318/811 |
| 4,879,503 | 11/1989 | Aoki et al. | 318/809 |
| 5,162,709 | 11/1992 | Ohi | 318/254 |
| 5,274,317 | 12/1993 | Utley et al. | 318/802 |
| 5,408,573 | 4/1995 | Jamieson et al. | 388/815 |
| 5,446,361 | 8/1995 | Van Der Broeck | 318/747 |
| 5,479,081 | 12/1995 | Seibel et al. | 318/805 |
| 5,492,273 | 2/1996 | Shah | 236/44 A |
| 5,530,332 | 6/1996 | Rees | 318/685 |

*Primary Examiner*—William M. Shoop, Jr.
*Assistant Examiner*—Kim Lockett
*Attorney, Agent, or Firm*—Factor and Shaftal. LLC

[57] ABSTRACT

The present application discloses a system and associated method for lowering heat dissipation created by running a motor. The system comprises a voltage regulator, the motor, and a controller. The voltage regulator is connected to a supply voltage and has an output voltage with an associated output current dependent upon impedance of the system. The motor, which may be AC or DC, is driven by the output voltage and an output current at a current running speed. The controller controls the supply of the output voltage and associated output current to the motor toward varying the current running speed of the motor while minimizing the power dissipated throughout the system.

15 Claims, 3 Drawing Sheets

APPARATUS AND METHOD FOR REDUCED VOLTAGE CONTROLLER

This application is a continuation-in-part of U.S. Pat. application Ser. Nos. 08/733,532 and 08/733,533, abandoned, both filed Oct. 18, 1996, both of which also claim the benefit of U.S. Provisional application Ser. No. 60/010,274, filed Jan. 19, 1996.

BACKGROUND OF THE INVENTION

1. Technical Field

The present invention relates in general to electric motors and, in particular, to a reduced voltage controller for operating a motor.

2. Background Art

As is well-known in the art, motor speed controllers can use a DC bus voltage supplied to one or more half bridges which are, in turn connected to the appropriate windings of a motor to control the motor speed. These half bridges switch between the top component (usually a power FET or IGBT) and the bottom. Where the top component is switched between the DC bus and ground, the output of the half bridge switches between full supply and zero volts. To minimize the audible noise, any switching of these components generally occurs above 20 kHz. The end result of switching these half bridges generates a sinusoidal wave, which is ideal to run an AC motor.

In the design of these motor systems, it is generally desirable to maximize motor and controller efficiency. One potential inefficiency is caused by the resistive heating of the electric components in the system, including in the controller output stage, as well as the windings of the controller motor. These losses are approximately equal to $I^2R$. As can be seen, the heat losses are only directly proportional to the resistance in the circuit, yet proportional to the square of the current through the circuit.

Accordingly, it is an object of the present invention to minimize heat losses in a motor controller by lowering the current through the controller and associated motor.

It is an associated object of the present invention to minimize the amount of heat sinking required in such a controller, which, in turn, will lower the overall controller cost.

These and other objects of the present invention will become apparent to those of ordinary skill in the art in light of the present specification, drawings and claims.

DISCLOSURE OF THE INVENTION

The present invention comprises a system for lowering heat dissipation created by running a motor. The system comprises a voltage regulator, the motor and means for controlling the voltage and current supplied to the motor. The voltage regulator is connected to a supply voltage and has an output voltage with an associated output current. The motor is driven by the output voltage and an associated output current and has a current running speed. The system also includes means for controlling the supply of the output voltage and associated output current to the motor toward varying the current running speed of the motor while minimizing the power dissipated throughout the system. This control can be achieved in various ways.

First, in a system where the motor is an alternating-current motor having a rotor and at least one winding, using the inherent inductance of each winding, the controlling means minimizes power dissipation in the system by limiting the amount of time the associated output current is fed into the windings of the motor. In particular, the controlling means via a current sensing device monitors current flow and turns off power supplied to the inductive winding at a predetermined current/voltage level, thus limiting the current fed into the windings.

In one embodiment of this type of system, the controlling means comprises means for sensing the current flowing through each of the windings; means for comparing the sensed current with a desired periodic waveform; and means for cutting off the associated output current fed into each of the windings of the motor as indicated by the comparing means, the inductance of each of the windings limiting change in the current flowing therethrough. In particular, the means for cutting off the associated output current may comprise—for each winding in the motor—a high side driver operatively connected to the comparing means; a first switch controlled by the high side driver toward connecting an associated winding to the voltage regulator; and a second switch controlled by the comparing means toward connecting an associated winding to electrical ground. Each of these switches may comprise power FETs or IGBTs.

Similarly, in systems of the type described above, the voltage regulator may be variable, thus providing a lower voltage to the motor and associated circuitry. As a result, until the rotor is at a speed requiring a higher voltage, the lower voltage is supplied by the regulator to minimize power losses.

In one embodiment having a variable voltage regulator, that regulator may generate the output voltage with the associated output current at one of a first or second voltage, wherein the first voltage being approximately half the second voltage. The voltage regulator generates a negative voltage having the same magnitude as the first voltage when the voltage regulator generates the first voltage. In this one embodiment, the advantages of a variable supply voltage, while minimizing the costs associated with a variable voltage control.

In a second type of system, the voltage regulator generates the output voltage with the associated output current at one of two or more potential voltages. This system produces a lower voltage input to the motor and associated controller circuitry until the motor can physically acquire and is required to be run at a speed requiring a higher voltage. Selection of the output voltage is controlled by controlling means to minimize power dissipation in the overall system.

In a preferred embodiment of this second type of system, the voltage regulator generates one of only a first and second voltage, wherein the first voltage is approximately half the second voltage. Controlling means minimize power dissipation in the system by causing the voltage regulator to output a second output voltage. The voltage regulator generates a negative voltage having the same magnitude as the first voltage when the voltage regulator generates the first voltage. Again, as was noted above, this functionality may also be used in combination with the first type of disclosed system.

The present application further discloses a method for lowering heat dissipation created running a motor by minimizing the excess current supplied to the motor. The motor having a rotor and at least one winding, at a variable running speed in a system including a voltage regulator connected to a supply voltage and having an output voltage with an associated output current. The method comprises the steps of: (a) selecting a desired speed for the motor, wherein the desired speed has a predetermined corresponding voltage waveform; (b) applying the associated current to each of the windings of the motor only during a selected interval; (c) determining a voltage developed across at least one of the windings of the motor by measuring the current through the at least one winding; (d) comparing the voltage to the predetermined corresponding waveform; (e) varying the selected interval based upon the comparison toward tracking the predetermined corresponding waveform; and (f) repeating steps (b)–(f) until a new desired speed is selected, and then returning to step (a).

The present application further discloses another method for lowering heat dissipation created by running a motor at a variable running speed in a system including a voltage regulator connected to a supply voltage and having two or more potential output voltages each having an associated output current. This method comprises the steps of: (a) selecting a first output voltage from the two or more output voltages of the voltage regulator to drive the motor between a first and second speed, wherein the first speed is less than the second speed; and (b) selecting a second output voltage from the two or more output voltages of the voltage regulator, the second output voltage being higher than the first output voltage to produce a third speed, wherein the third speed is greater than the second speed.

The present application discloses yet another method for lowering heat dissipation created by running a motor at a variable running speed by minimizing the excess current supplied to the motor by including a voltage regulator connected to a supply voltage and having two or more output voltages each with an associated output current. The method includes: (a) selecting a first optimized voltage from the two or more output voltages of the voltage regulator to drive the motor at a first desired speed; and (b) altering the associated output current delivered on average to the motor based upon the selected first optimized voltage. Within this method, where the selected voltage is lower than the nominal voltage, the step of altering the associated output current involves extending application of the selected voltage to the motor for a longer period than used for the nominal voltage. This method may further include: (a) selecting a second optimized voltage from the two or more output voltages of the voltage regulator to drive the motor at a second desired speed upon selection of the second desired speed; and (b) altering the associated output current delivered on average to the motor based upon the selected second optimized voltage.

MODES FOR CARRYING OUT THE INVENTION

Figure 1:
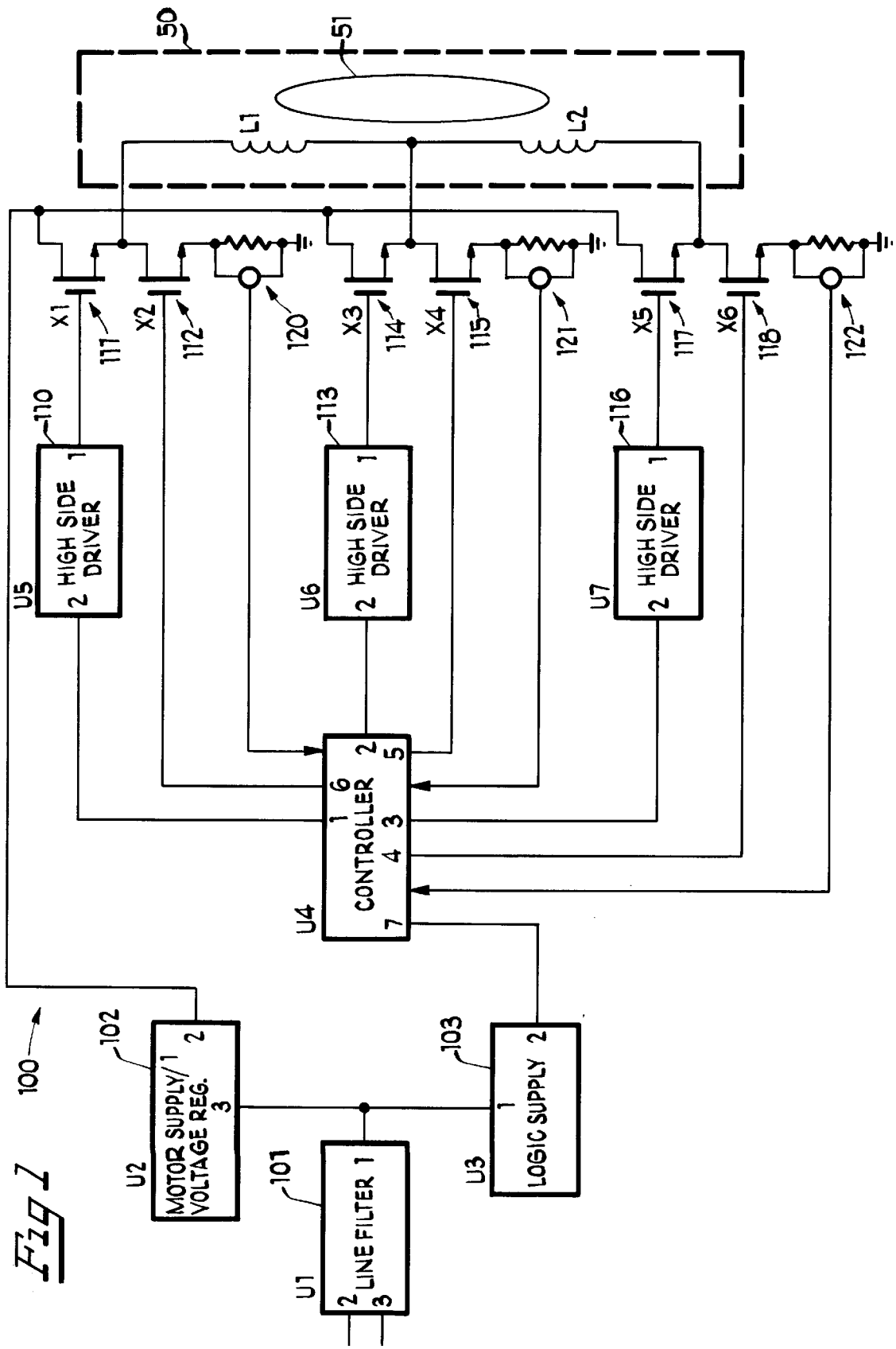
FIG. 1 of the drawings is a schematic block diagram of one system for reduced voltage control of an AC motor.

While this invention is susceptible of embodiment in many different forms, there is shown in the drawings and will herein be described in detail, a plurality of embodiments with the understanding that the present disclosure is to be considered as an exemplification of the principles of the invention and is not intended to limit the invention to any of the embodiments disclosed herein.

FIG. 1 of the drawings shows one particular system 100 for lowering the voltage used to control a motor, such as AC motor 50 with windings L1 and L2 and rotor 51. Any motor, DC, single-, two- or three-phase AC work equally well, requiring only minor modifications to the two-phase AC motor embodiment shown (as would be known to one of ordinary skill in the art). System 100 also includes AC line filter 101, motor supply 102, logic supply 103, controller 104, high side drivers 110, 113 and 116, and power FETs 111, 112, 114, 115, 117 and 118. AC line filter 101 is connected to mains power and removes noise from the AC supply signal, which is supplied, in turn, to motor supply 102 and logic supply 103. Motor supply 102 and logic supply 103 are each conventional AC-to-DC converter/DC voltage regulator apparatuses.

In a preferred embodiment, motor supply 102 is configured to supply 170 VDC and logic supply 103 to supply TTL level voltages. Of course, the values of this voltage depends on the particular system design and specification and as such are a matter of design choice. The 170 VDC motor supply voltage is connected to the drains of power FETs 111, 114 and 117 through which the source voltage is ultimately supplied to the windings of AC motor 50. This voltage pass-through from motor supply to motor winding occurs when the voltage at the gates of power FETs 111, 114 and 117 sufficiently exceeds the voltage at the emitter by approximately 10 VDC. As would be understood by one of ordinary skill in the art, these power FETs can be easily replaced by IGBTs, which will run in a very similar manner to that described with respect to the power FETs herein.

The gate of each power FET is driven by a respective one of high side drivers 110, 113 and 116. High side drivers 110, 113 and 116 isolate controller 104 from the power FETs and shift the voltage level of the signals generated by controller 104 such that each voltage signal can properly bias the power FETs. Each high side driver may comprise a conventional diode (that saturates and depletes at speeds sufficient to support the switching frequencies of the application, which typically exceeds 20 kHz) and capacitor controlled by a respective signal from controller 104.

Figure 3:
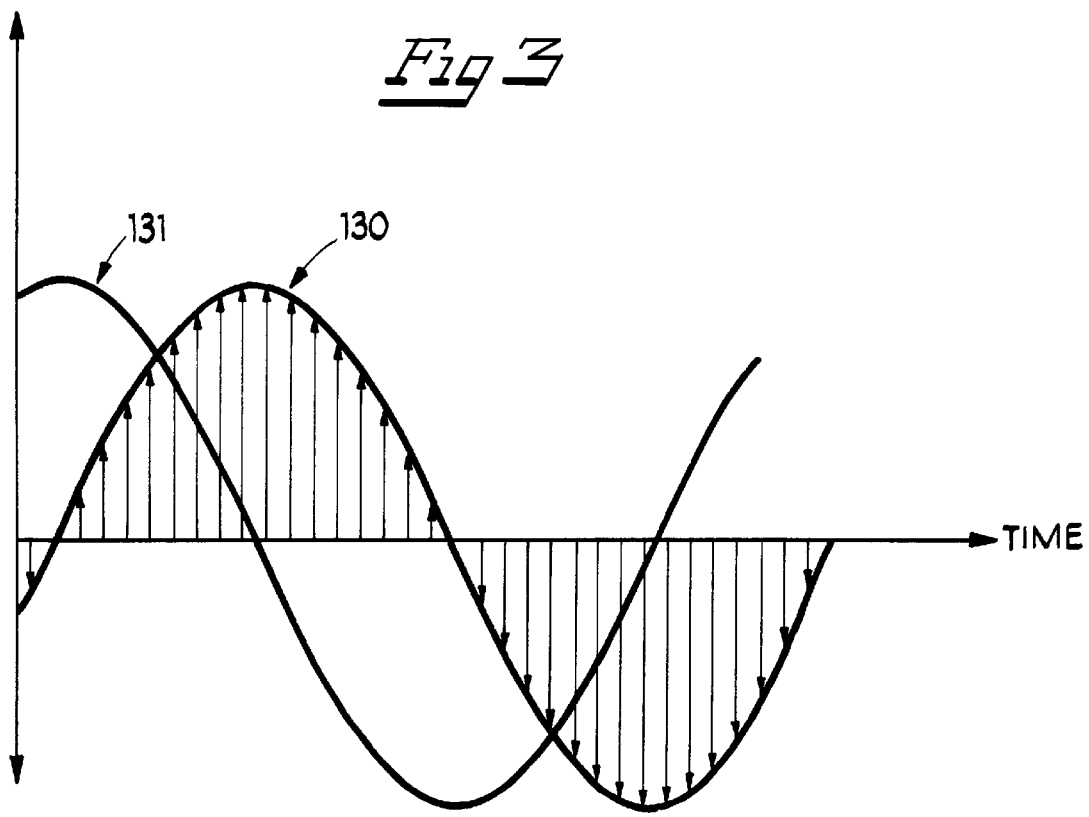
FIG. 3 of the drawings is a graphical representation of the current pulses resulting from operation of the controller forming a sine wave pattern at the envelope of those pulses.
Figure 4:
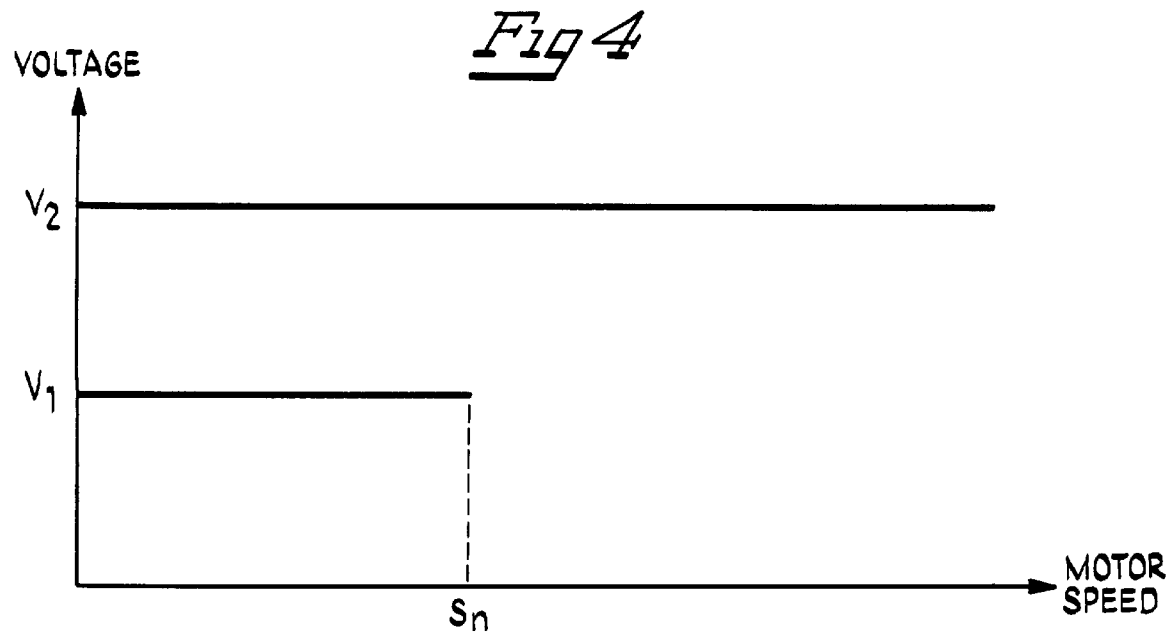
FIG. 4 of the drawings is a graphical representation of the relationship between available voltage and motor speed.

Controller 104, unlike the usual motor controller which controls the supplied voltage in a sinusoidal wave signal, develops a sinusoidal signal by limiting the current flowing to the windings of motor 50 in such a manner that the current flow resembles a sinusoid. As this novel approach is identical for each output bridge, the first bridge will be described in detail with the understanding that the description applies equally to the other bridges. When upper FET 111 is turned on, the current through FET 111 and winding L1 of motor 50 will rise. The current continues to rise until FET 111 is turned off and FET 112 is turned on. At that time, the current will flow out of winding L1 through FET 112 and current sense circuit 120 to ground. The longer FET 111 is on, the higher the current developed through the winding and, conversely, the shorter FET 111 is on, the lower the current developed through the winding. As shown in FIG. 3, by viewing each resulting current pulse (as indicated by the impulse markers) at the envelope, pulsing FET 111 over time results in a sine wave current pattern 130. This sinusoidal current, in turn, develops a sinusoidal voltage 131 across the motor windings.

The rate at which the current rises through each winding depends on the inductance of that winding, the resistance in the circuit and the actual DC bus voltage supplied by motor supply 102 via each particular upper FET. Once these variables are known for a particular system, the timing can be programmed into or memorized by controller 104. Once these system parameters and the load on the motor are known, motor 50 can be operated at various speeds by comparing the contemporaneous feedback from current sense circuits 120, 121 and 122 to a sine wave pattern known to produce the desired motor speed. Based on this comparison, the current driving motor 50 can be limited resulting in the minimization of power dissipation in the circuit.

Controller 104, in this embodiment, may comprise a standard motor speed controller. Controller 104 controls each output bridge (111 and 112; 114 and 115; and 117 and 118) via high side drivers 110, 113 and 116, such that the upper FETs 111, 114 and 115 conduct for a controlled amount of time. Lower FETs 112, 115 and 118 are active when the upper FETs are not, thus, connecting each respective winding of motor 50 to ground. Current sense circuits 120, 121 and 122 are inserted between the source side of these lower FETs and ground. Thus, during the non-charging period, each winding discharges through its associated lower FET (112, 115 and 118) and current sense circuit (120, 121 and 122) to ground. The voltage across each current sense circuit—which may simply comprise a small resistive element—is communicated to controller 104 as a measure of the coil charging value because the discharge current of each winding is generally symmetrical to charging current of each winding. Alternatively, each of the current sense circuits could be placed elsewhere within the system to similarly measure the charging (or discharging) current through each winding, as would be known to those of skill in the art having the present disclosure before them. Of course, it is further contemplated that at least one current sense device will be connected to the at least one winding of the motor. Generally, this single measurement will serve as a good approximation of the performance in the other windings.

Figure 1A:
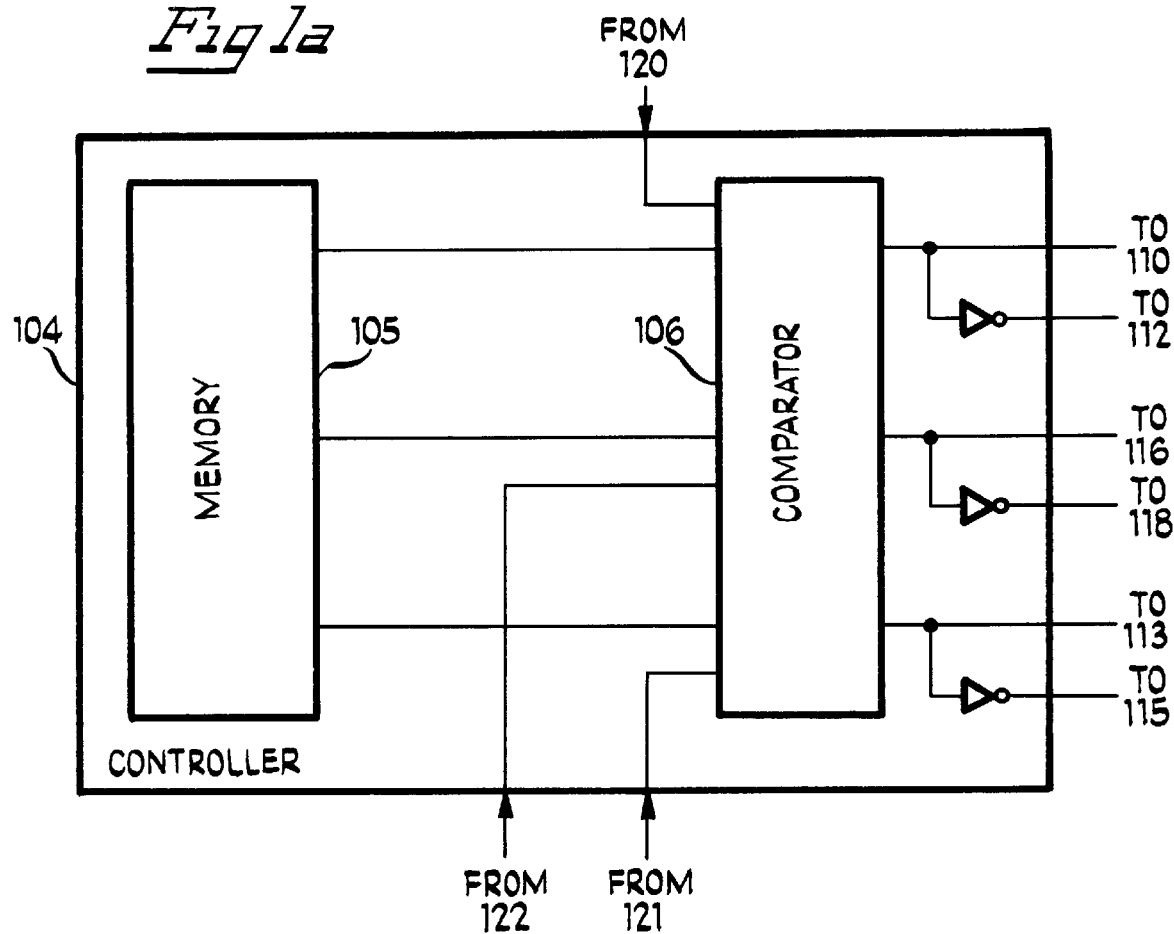
FIG. 1a of the drawings is a block diagram of the current-limiting controller of FIG. 1.

As shown in FIG. 1a, to facilitate the foregoing functionality, controller 104 includes memory 105 and comparator 106. Memory 105 contains data corresponding to one or more sine wave patterns, each analytically predetermined to provide only the current required to produce a particularly desired motor speed in motor 50. The specifically required currents are determinable based on the known inductance of motor windings L1 and L2, the known circuit resistance, the known DC bus voltage from motor supply 102, and the known load on motor 50. So for instance, in programming memory 105 for a known motor to be used in a mass-produced HVAC system (thus having a known load), the HVAC system designers can select a set of desired, optimal motor speeds (e.g. 10%, 70% and 100% of maximum speed) to achieve particular heating and/or cooling parameters for a desired type of use (e.g. residential, commercial or industrial) and then analytically determine for the motor under each parameter the necessary current. The various optimal speeds selected to acheive desired heating and/or cooling parameters are a matter of design choice, which is conventional in the HVAC art. It should be understood, though, that the present invention has application in useful endeavors, which utilize motors to drive known loads other than HVAC systems.

Figure 2:
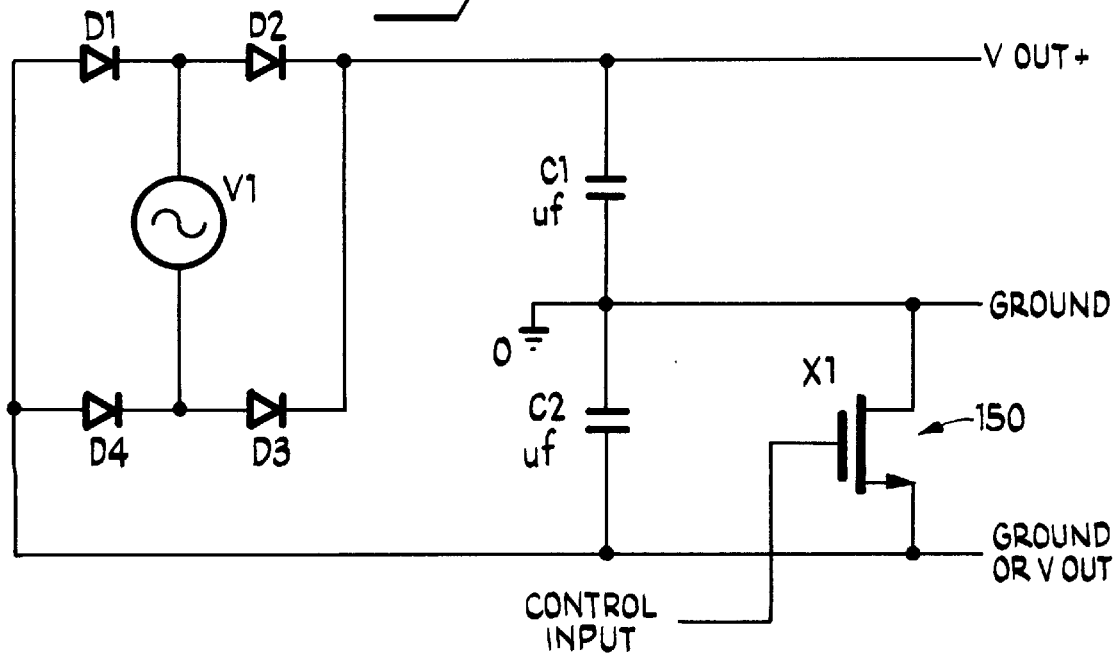
FIG. 2 of the drawings is a schematic block diagram of a low voltage supply as another system for reducing voltage control of an AC motor.

Another embodiment of the present invention is shown in FIG. 2 of the drawings. In this embodiment, the power dissipation in a motor circuit is minimized by limiting the voltage supplied by the voltage regulator to the drivers, half bridges and the motor until full voltage is needed to power the motor at maximum speed. During lower voltage supply, because the associated output current is also necessarily lower, the time that such voltage is actually applied to the windings of the motor is increased. It has been determined (through computer modeling) that in a motor running between 30 to 60% maximum speed there is an efficiency increase of between 5% and 35% (at about 60% and 30% maximum speed, respectively).

In its simplest form, this embodiment of the present invention may comprise a variable voltage supply. A preferred embodiment of the motor supply circuit which can be substituted for motor supply circuit 102 of FIG. 1 is shown in FIG. 2. Of course, this substitute motor supply may be used independently of the teachings of FIG. 1; placing it in circuits known in the prior art. This preferred version of the modified motor supply circuit provides the option to drive motor 50 at one of two voltages: half or full voltage and thus is less expensive to implement that a fully variable voltage supply, while still achieving the desired benefits of the present embodiment. Of course, a conventional variable voltage supply for supplying one of more than two voltages could also be used within the present invention.

In this preferred version of the second embodiment, switch 150 controls whether the power supply outputs (for a 120 VAC mains supply) either: (a) 170 VDC or (b) +85 VDC and -85 VDC. When switch 150 is on, the output is 170 VDC allowing the three half bridges (i.e. power FETs 111, 114 and 117) to operate in the normal mode. When switch 150 is off, the output is +85 and -85 VDC, which turns FET 114 off and FET 115 on, thus supplying half voltage across the motor windings. Accordingly, by using the modified motor supply circuit, the supply voltage can be controlled to match the present needs of motor 50 for each stage of its operation (i.e. from cold-start to steady state). As known in the art, different voltage levels accommodate motor speeds in different ranges dependent upon the nominal values of the components and system loads. For instance between cold-start (or zero motor speed) and some motor speed, $S_n$, V1 can be used to provide sufficient power. However, beyond $S_n$ the motor would require more voltage than V1, such as V2. For the other embodiment of this type, the voltage regulator would be controlled via a control means for selecting a desirable voltage at which the circuitry and motor should be run based on the present speed of the motor.

In either embodiment of this type, the power delivered to the motor is maintained at the desired level by increasing the period during which the supply voltage drives the windings of the motor as the supply voltage is decreased. The necessary control would be facilitated by controller 104 by including additional predetermined sine waves in memory 105 for use during application of each of the voltages that can be generated by motor supply circuit 102 and the predetermined changeover point from lower voltage to higher voltage to run motor 50. In this manner, the desired power dissipation can be achieved, while providing the requisite power to the motor.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

What is claimed is:

1. A system for lowering heat dissipation created by running a motor at a desired speed under a known load, the system comprising:

a voltage regulator connected to a supply voltage and having an output voltage with an associated output current dependent upon impedance of the system;

the motor being driven by the output voltage and an associated output current and having a present running speed; and means for controlling the supply of the output voltage and associated output current to the motor based on analytically predetermined parameters of the system for driving the motor at the desired speed under the known load to make the present running speed of the motor the desired speed of the motor while minimizing the power dissipated throughout the system, wherein the controlling means includes memory which includes data corresponding to one or more sine wave patterns, each analytically predetermined to provide only the current required to produce a particular desired motor speed.

2. The system according to claim 1 wherein the motor comprises an alternating-current motor having a rotor and at least one winding, each of the at least one winding having an inductance, the controlling means minimizes power dissipation in the system by limiting the associated output current fed into each of the at least one winding of the motor in a periodic manner.

3. The system according to claim 2 wherein the controlling means comprises:

means for sensing the current flowing through at least one of the at least one winding;

means for comparing the sensed current with a predetermined desired periodic waveform; and means for cutting off the associated output current fed into each of the at least one winding of the motor as indicated by the comparing means, the inductance of each of the at least one winding limiting change in the current flowing through each of the at least one winding.

4. The system according to claim 3 wherein the means for cutting off the associated output current fed into each of the at least one winding comprises for each associated one of the at least one winding:

a high side driver operatively connected to the comparing means;

a first switch controlled by the high side driver toward connecting the associated one of the at least one winding to the voltage regulator; and a second switch controlled by the comparing means toward connecting the associated one of the at least one winding to electrical ground.

5. The system according to claim 3 wherein the voltage regulator generates the output voltage with the associated output current at one of two or more voltages and the controlling means selects the one of the two or more voltages and a switching rate to optimize power dissipation in the system.

6. The system according to claim 5 wherein the voltage regulator generates the output voltage with the associated output current at one of a first and second voltage, the first voltage being approximately half the second voltage, the voltage regulator further generating a negative voltage having the same magnitude as the first voltage when the voltage regulator generates the first voltage.

7. The system according to claim 1 wherein the voltage regulator generates the output voltage with the associated output current at one of two or more voltages and the controlling means selects the one of the two or more voltages and a switching rate to optimize power dissipation in the system.

8. The system according to claim 7 wherein the voltage regulator generates the output voltage with the output current at one of a first and second voltage, the first voltage being appoximately half the second voltage, controlling means minimizes power dissipation in the system by causing the voltage regulator to output a second output voltage, the voltage regulator futher generating a negative voltage having the same magnitude as the first voltage when the voltage regulator generates the first voltage.

9. A method for lowering heat dissipation created by running a motor, having a rotor and at least one winding, at a variable running speed in a system including a voltage regulator connected to a supply voltage and having an output voltage with an associated output current depending upon impedance of the system, and a controller, wherein the controller has memory which contains data corresponding to one or more sine wave patterns, each analytically predetermined to provide only the current required to produce a particular desired motor speed, the method comprising the steps of:

(a) designating a desired speed for the motor, the desired speed having an analytically predetermined corresponding voltage waveform;

(b) applying the associated current to each of the at least one winding of the motor only during a selected interval;

(c) measuring a voltage developed across at least one of the at least one winding of the motor;

(d) comparing the voltage to the analytically predetermined corresponding waveform;

(e) varying the selected interval based upon the comparison toward tracking the analytically predetermined corresponding waveform; and (f) repeating steps (b)–(f) until a new desired speed is designated and then returning to step (a).

10. The method according to claim 9 wherein the step of selecting a desired speed further comprises:

selecting a predetermined speed slower than the desired speed for the motor; and then selecting the desired speed for the motor once the motor has reached the predetermined slower speed.

11. A method for lowering heat dissipation created by running a motor at a variable running speed in a system including a voltage regulator connected to a supply voltage and having two or more output voltages each with an associated output current dependent upon impedance of the system, the method comprising the steps of:

(a) selecting a third speed at which it is desired to operate the motor;

(b) using a first output voltage from the two or more output voltages of the voltage regulator to drive the motor between a first speed and a second speed, wherein the first speed is less than the second speed and the second speed is less than the third speed; and (c) then once the running speed of the motor approaches the second speed using a second output voltage from the two or more output voltages of the voltage regulator, the second output voltage being higher than the first output voltage, to drive the motor between the second and third speeds.

12. A method for lowering heat dissipation created by running a motor at a variable running speed in a system including a voltage regulator connected to a supply voltage and having two or more output voltages with each with an associated output current dependent upon impedance of the system, the motor having a nominal voltage, the method comprising the steps of:

(a) selecting a first voltage (less than the nominal voltage of the motor) from the two or more output voltages of the voltage regulator to drive the motor up to a first desired speed; and (b) altering the associated output current delivered on average to the motor based upon the selected first voltage.

13. The method according to claim 12 wherein the selected first voltage is lower than the nominal voltage of the motor, the step of altering the associated output current comprises the step of extending application of the selected first voltage to the motor for a longer period than analytically determined period for operation at the nominal voltage.

14. The method according to claim 12 further comprising the step of:

(a) selecting a second voltage from the two or more output voltages of the voltage regulator to drive the motor above the first desired speed and up to a second desired speed upon selection of the second desired speed; and (b) altering the associated output current delivered on average to the motor based upon the selected second voltage.

15. The method according to claim 14 wherein the selected second voltage is lower than the nominal voltage of the motor, the step of altering the associated output current comprises the step of extending application of the selected second optimized voltage to the motor for a longer period than analytically determined period for operation at the nominal voltage.

* * * * *

UNITED STATES PATENT AND TRADEMARK OFFICE
CERTIFICATE OF CORRECTION

PATENT NO. : 5,932,981
DATED : August 3, 1999
INVENTOR(S) : Nick Vrionis

It is certified that error appears in the above-identified patent and that said Letters Patent is hereby corrected as shown below:

Col. 8, line 2                          After "the" and before "output" insert --associated--. (2nd occurrence)

Signed and Sealed this

Twenty-eighth Day of March, 2000

Attest:

Q. TODD DICKINSON

*Attesting Officer*            *Commissioner of Patents and Trademarks*